Dec. 31, 1935.  J. O. JACKSON  2,026,279
STORAGE TANK
Filed Dec. 26, 1933
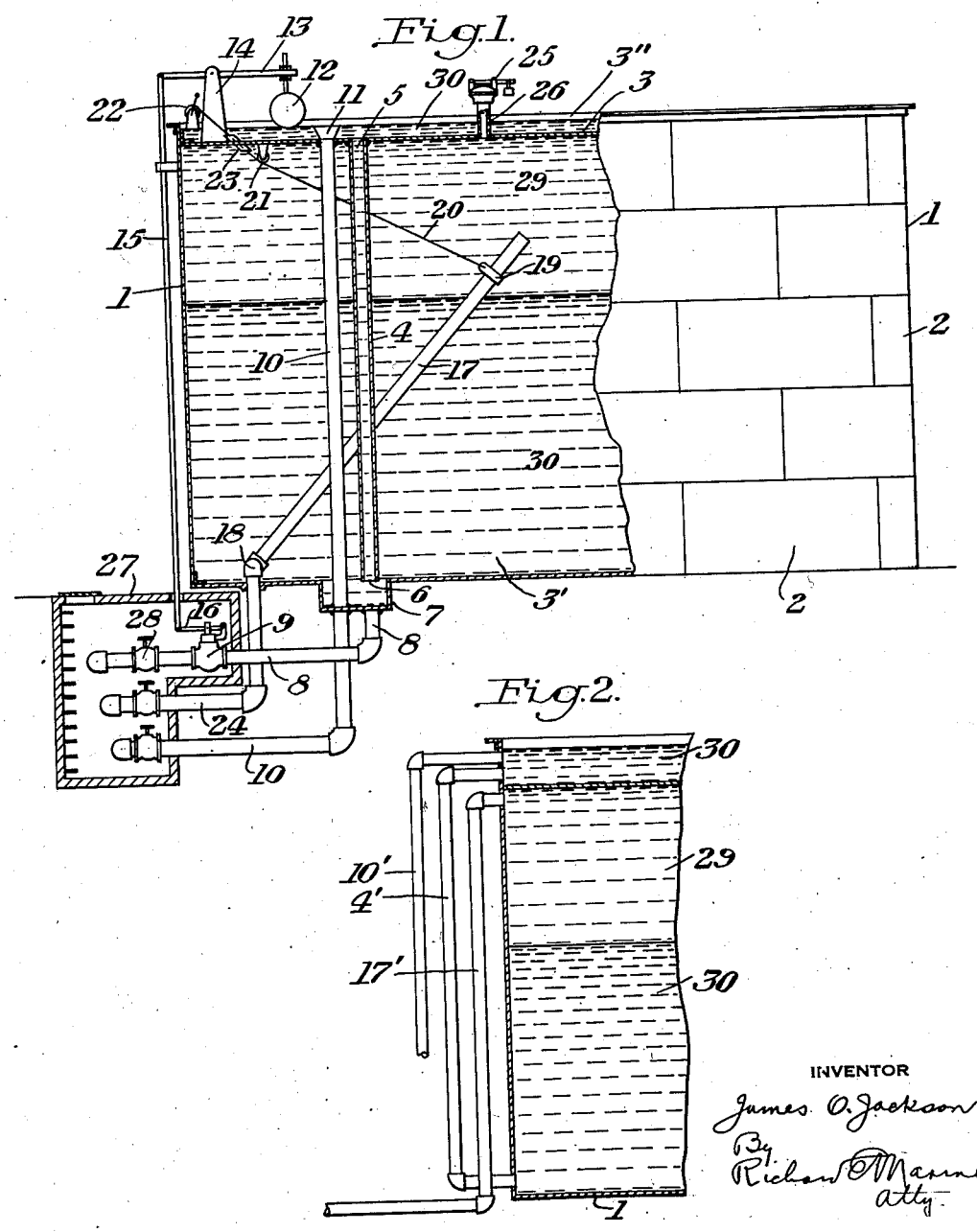
INVENTOR
James O. Jackson
By Richard O Marine
Atty.

Patented Dec. 31, 1935

2,026,279

UNITED STATES PATENT OFFICE 2,026,279

STORAGE TANK

James O. Jackson, Crafton, Pa.

Application December 26, 1933, Serial No. 703,930

5 Claims. (Cl. 220—85)

My invention relates to tanks, and the like, designed to store fluids, and more particularly to tanks for storing volatile liquids which rapidly evaporate when exposed to air.

It is the object of my invention to prevent the evaporation losses and the dangers attending them.

To this purpose my invention contemplates the provision of a closed storage tank arranged to contain a varying amount of liquid without the liquid being exposed at any time to air or free space in the tank, thereby preventing its evaporation.

This I conveniently accomplish by varying the effective storage capacity of the tank, or reservoir, to make it correspond exactly to the volume of the liquid in storage at any given time, so that no free space above the liquid, into which the liquid may evaporate, is allowed to exist.

The particular embodiment of my invention disclosed herein contemplates regulation of the effective capacity of the main storage reservoir by the introduction of a second liquid, preferably immiscible with the stored liquid, preferably of greater specific gravity and in such quantity that in conjunction with the stored liquid the closed tank or reservoir will always be filled, leaving no free space for evaporation. The variation in the effective storage capacity may be effected manually or by means responsive to the variations in volume of the stored liquid, as where some of it is drawn off for use.

My invention further contemplates the provision of a storage tank which maintains the temperature of the stored liquid lower than the atmospheric temperature which materially aids in preventing the liquid from evaporating.

This I conveniently accomplish by providing over the top of the tank, or main reservoir, an auxiliary, preferably open and conveniently relative shallow reservoir into which a protecting liquid is placed which by its evaporation reduces the temperature of the tank and that of the stored liquid, thus reducing the tendency of the latter to evaporate. It is of course obvious that other cooling systems may be employed.

My invention further makes it possible to utilize the same supply of liquid for cooling the tank and for effecting the changes in its storage capacity. To this end I connect the auxiliary reservoir, which extends over the top of the tank, with the main reservoir. This I preferably accomplish by means of a pipe opening at its upper end into the auxiliary reservoir and at its lower end into the main reservoir below the lowermost point reached by the volatile liquid in storage. A cooling liquid, of greater specific gravity than the stored liquid, introduced into either reservoir will then completely fill the space in the main reservoir not occupied by the stored liquid, as well as the pipe and the auxiliary reservoir to the point of overflow of the latter.

Other novel features and advantages of my invention will hereinafter appear.

In the accompanying drawing in which I have illustrated for purposes of exemplification but without limiting the claimed invention thereto, certain practical embodiments of the principles of my invention:

Fig. 1 is a side elevation of my tank, and its component parts, partly in section and Fig. 2 shows a modified form of flow pipe for the stored liquid.

Referring to the drawing 1 represents a large tank or stand pipe preferably made up of steel plates or sections 2. This type of tank is commonly used for storing water, oil or gasoline and is frequently seen in the oil fields or around refining and pumping stations. The tank is provided with the usual bottom and a roof 3, conveniently of steel, which is secured around its periphery to the sides of the tank and completely seals its top. The roof is preferably positioned inside the tank, about one foot or more below its upper edge to form a main reservoir 3' in the lower portion of the tank and an auxiliary reservoir 3'' at its upper end. The roof may be supported on steel columns or in other suitable manner, not shown.

Welded to the roof 3 is a downcomer pipe 4, the upper end of which opens into the space above the roof as shown at 5, while its lower end opens into the tank near its bottom, or below the lowest point reached by the stored liquid, as shown at 6 in Fig. 1.

In lieu of locating this pipe on the inside of the tank it may be located on the outside, as at 4' in Fig. 2.

In the bottom of the tank is a sump 7 into which the water inlet pipe 8 opens. The flow of the water thereto is controlled by the valve 9.

The auxiliary reservoir at the top is provided with an overflow or drain pipe 10, the upper end of which is advantageously provided with the funnel shaped portion 11 which extends above the roof 3 but not as high as the rim of the tank. The overflow pipe conveniently passes through the roof 3 and down through the tank and sump, being welded to the roof and the bottom to effect a liquid seal. The maximum level of the water above the roof is maintained by this overflow pipe.

If desired, the overflow pipe may be located outside the tank, as shown at 10', in Fig. 2, or the waste water may be permitted to overflow the top rim of the tank.

A valve float 12 regulates the height of the water above the roof 3 between definite limits. The float is suspended from one end of the lever 13 which is pivotally mounted on the fulcrum support 14. The other end of the lever has attached thereto the link 15 which is pivotally connected to the valve operating lever 16 of the valve 9. Thus any change in the water level above the roof 3 changes the height of the float which transmits motion to the lever thereby opening or closing the valve according to the final position of the float. When the water is about to overflow into the drain pipe 10 the position of the float is such that the valve 9 is shut off.

17 is a swing pipe which is pivotally supported at its lower end as at 18. The upper end of this pipe is provided with a clamp 19 which has attached thereto the pipe supporting and adjusting cable 20. The cable 20 is arranged to ride over the pulley 21 and through the roof to the winch 22. Sealing means 23 are provided for the cable 20 as it passes through the roof 3.

With this arrangement the position of the free end of the swing pipe in the tank is determined by the amount of cable released from the winch. The swing pipe is used for admitting or withdrawing the liquids of lighter specific gravity through the pipe 24 from the tank and is of particular utility where there are layers of stored liquid having different characteristics which it may be desired to withdraw selectively. It can also be used to drain the water from the tank, if desired. It is therefore desirable to be able to position the free end of the swing pipe in the zone occupied by the liquid to be moved.

It may be advantageous in some cases, however, to employ a stationary feed and offtake pipe for the stored liquid, either inside or outside the tank, the latter being shown at 17' in Fig. 2. Similar pipes located at different elevations may be employed to take off from other portions of the tank.

A pressure and vacuum release valve 25 is connected to the tank proper by means of the pipe 26. This valve is adjusted to relieve the tank of any undesirable pressure or vacuum that may accumulate therein.

The tank is provided with the valve chamber 27 which is placed below the surface of the ground and relatively near to the tank. All the pipe lines that are in any way associated with the tanks are brought through the valve chamber and each line is provided with adequate valves 28 for controlling the storage or withdrawal of the liquids from the tank. The several pipe lines are, for clearness, shown at different levels in the valve chamber 27, but it will be understood that they may be advantageously located on the same level, which would not require so deep a chamber and would render them more convenient of access.

The operation of my invention is as follows. Water is admitted into the main reservoir 3' through the inlet pipe 8 by opening the valve 28, the valve 9 being open as the float 12 is resting on the roof 3. The pressure relief valve 25 is opened and water is then permitted to completely fill the tank. The pressure relief valve 25 is then closed and water continues to flow, through the pipe 4, until it fills the auxiliary reservoir 3" above the roof 3 and causes the float 12 to rise which actuates the valve 9 shutting off the water supply. Any overflow of the water is drained through the funnel 11 and the pipe 10.

Gasoline or oil or any fluid having a specific gravity lighter than water, which will not mix therewith, or combination of such fluids, is admitted into the tank through the swing pipe 17 which is held by the cable 20 and windlass 22 near the under side of the roof 3. The liquid thus admitted displaces its equivalent volume of water under the roof 3. The displaced volume of water is then forced up through the downcomer pipe 4 to the space above the roof and overflows through the drain pipe 10. As shown on the drawing the volatile liquid is designated as 29 and the water as 30.

If the liquid of lighter specific gravity is partially withdrawn from the tank through the swing pipe 17 the water above the roof flows down through the downcomer pipe 4 and replaces the volume of the liquid withdrawn. This flow of water from the roof 3 is determined by the head of water above the roof which is higher than the liquid withdrawn. As soon as the level of water above the roof is decreased the float opens the valve 9 and water is admitted to the tank through the intake pipe 8. The new supply of water replenishes the volume of liquid that was withdrawn which is determined when the head of water above the roof is replenished and the valve 9 is shut off by the rising of the float 12 as shown in the drawing. Thus the automatic float 12 maintains the water at the proper level above the roof.

When the tank is to be refilled with the liquid of lighter specific gravity the latter is pumped into the tank through the swing pipe 17 and displaces its equal volume of water as previously described.

My invention thus provides a storage tank for volatile liquids of lighter specific gravity than water and at no time during the refilling, storage or withdrawing periods is the liquid exposed to air which exposure causes a loss of the liquid by evaporation. This loss is serious and quite expensive and in the ordinary underground tanks for storing gasoline and oil by retail distributors for ordinary automobile service it is severely felt. The loss is greater when the volatile liquid is exposed to circulating air than to pocketed air in the tanks.

It is sometimes advantageous to provide two swing pipes, one for supplying and the other for withdrawing the more precious liquids from the tank, especially when the tank is arranged to receive and deliver the liquids to different lines.

The water above the roof of the tank is usually open to the air and evaporates. The loss of water due to this evaporation is replenished by the action of the automatic float. Such evaporation cools the roof of the tank, thereby reducing the tendency of the more precious liquids to volatilize.

It is quite obvious that two of the more precious liquids could be stored in the same tank if they would not dissolve or in any way react with one another.

While, in accordance with the patent statutes, I have illustrated and described the best form of my invention known to me, it will be understood that changes may be made in the apparatus disclosed, without departing from the spirit of my invention, and that certain features may sometimes be used to advantage without a corresponding use of other features.

I claim:—

1. In a storage tank for a fluid, in combination: a main reservoir for the fluid to be stored; an auxiliary reservoir above and adapted to maintain a protecting fluid over the top of the main reservoir, and in communication with the main reservoir below the bottom thereof; means for introducing into said main reservoir the fluid to be stored and also a second fluid of greater specific gravity than, and immiscible with, the stored fluid and in sufficient quantity to fill the space in the main reservoir unoccupied by the stored fluid and to rise into the auxiliary reservoir.

2. In a storage tank for a fluid, in combination: a main reservoir for the fluid to be stored; having a sump below and in communication with its bottom; an auxiliary reservoir above and adapted to maintain a protecting fluid over the top of the main reservoir, and in communication with the sump below the bottom of the main reservoir; means for introducing into said main reservoir the fluid to be stored and also a second fluid of greater specific gravity than, and immiscible with, the stored fluid and in sufficient quantity to fill the space in the main reservoir unoccupied by the stored fluid and to rise into the auxiliary reservoir.

3. In a storage tank for a fluid, in combination: a main reservoir for the fluid to be stored having a sump below and in communication with its bottom; an auxiliary reservoir above, and adapted to maintain a protecting fluid over the top of, the main reservoir; a conduit communicating with the bottom of said auxiliary reservoir and said sump below the bottom of said main reservoir; a conduit for introducing into said main reservoir through its bottom the fluid to be stored; a conduit for introducing into said sump through its bottom a second fluid of greater specific gravity than, and immiscible with, the fluid to be stored, and an overflow conduit extending from a point above the bottom of said auxiliary reservoir through said main reservoir and its bottom.

4. In a storage tank for a fluid, in combination: a main reservoir for the fluid to be stored; an auxiliary reservoir above, and adapted to maintain a protecting fluid over the top of, the main reservoir; a conduit communicating with the bottom of said auxiliary reservoir and said main reservoir near its bottom; a conduit for introducing into said main reservoir through its bottom the fluid to be stored; a conduit for introducing into said main reservoir through its bottom a second fluid of greater specific gravity than, and immiscible with the fluid to be stored; an overflow conduit extending from a point above the bottom of said auxiliary reservoir through said main reservoir and its bottom, and a valve chamber located below said reservoirs through which all of said conduits are passed and in which are located valves for the control of the flow through said conduits.

5. In a storage tank for a fluid, in combination: a main reservoir for the fluid to be stored; an auxiliary reservoir above, and adapted to maintain a protecting fluid over the top of, the main reservoir; a conduit communicating with the bottom of said auxiliary reservoir and said main reservoir near its bottom; a conduit for introducing into said main reservoir through its bottom the fluid to be stored; a conduit for introducing into said main reservoir through its bottom a second fluid of greater specific gravity than, and immiscible with the fluid to be stored; and an overflow conduit extending from a point above the bottom of said auxiliary reservoir through said main reservoir and its bottom.

JAMES O. JACKSON.